Nov. 7, 1961 B. P. J. VAN BERKEL 3,008,006

REGENERATIVE TELEGRAPH REPEATER

Filed May 29, 1959 3 Sheets-Sheet 1

INVENTOR
BERNARDUS PETRUS JOHANNES VAN BERKEL
BY
Frank R. Jifari
AGENT

| LP | TA | K1 | K2 | K3 | K4 | K5 | K6 | K7 | K8 |
|---|---|---|---|---|---|---|---|---|---|
| a | | 1 | 0 | 0 | 1 | 1 | 1 | 1 | 1 |
| b | | 1 | 0 | 0 | 1 | 1 | 1 | 1 | 1 |
| c | | 1 | 0 | 0 | 1 | 1 | 1 | 1 | 1 |
| 1 | | 1 | 1 | 0 | 0 | 1 | 0 | 1 | 1 |
| 2 | | 1 | 0 | 1 | 0 | 0 | 1 | 0 | 1 |
| 3 | | 1 | 0 | 0 | 1 | 0 | 0 | 1 | 0 |
| 4 | | 1 | 0 | 0 | 0 | 1 | 0 | 0 | 1 |
| 5 | | 1 | 1 | 0 | 0 | 0 | 1 | 0 | 0 |
| 6 | | 1 | 1 | 1 | 0 | 0 | 1 | 1 | 0 |
| 7 | | 1 | 1 | 1 | 1 | 0 | 1 | 1 | 1 |
| 8 | | 0 | 1 | 1 | 1 | 1 | 0 | 1 | 1 |
| 9 | | 0 | 0 | 1 | 1 | 1 | 1 | 0 | 1 |
| 10 | | 0 | 1 | 0 | 1 | 1 | 0 | 1 | 0 |
| 11 | | 0 | 0 | 1 | 0 | 1 | 0 | 0 | 1 |
| 12 | | 0 | 1 | 0 | 1 | 0 | 1 | 0 | 0 |
| 13 | | 0 | 1 | 1 | 0 | 1 | 1 | 1 | 0 |
| 14 | | 0 | 0 | 1 | 1 | 0 | 1 | 1 | 1 |
| 15 | | 0 | 0 | 0 | 1 | 1 | 0 | 1 | 1 |
| 16 | | 0 | 1 | 0 | 0 | 1 | 1 | 0 | 1 |
| 17 | | 0 | 0 | 1 | 0 | 0 | 0 | 1 | 0 |
| 22 | | 0 | 1 | 1 | 1 | 0 | 0 | 1 | 1 |
| 23 | | 0 | 1 | 1 | 1 | 1 | 1 | 0 | 1 |
| 24 | | 0 | 0 | 1 | 1 | 1 | 0 | 1 | 0 |
| 97 | | 0 | 1 | 1 | 1 | 0 | 1 | 1 | 0 |
| 98 | | 1 | 1 | 1 | 1 | 1 | 1 | 1 | 1 |
| 99 | | 1 | 0 | 0 | 1 | 1 | 1 | 1 | 1 |
| 100 | | 1 | 0 | 0 | 1 | 1 | 1 | 1 | 1 |
| 101 | | 1 | 0 | 0 | 1 | 1 | 1 | 1 | 1 |

FIG. 2

INVENTOR

BERNARDUS PETRUS JOHANNES VAN BERKEL

BY

AGENT

INVENTOR
BERNARDUS PETRUS JOHANNES VAN BERKEL
BY Frank R. Jifani
AGENT 3,008,006

REGENERATIVE TELEGRAPH REPEATER

Bernardus Petrus Johannes van Berkel, Hilversum, Netherlands, assignor to North American Philips Company, Inc., New York, N.Y., a corporation of Delaware
Filed May 29, 1959, Ser. No. 816,893
7 Claims. (Cl. 178—70)

Figure 1:
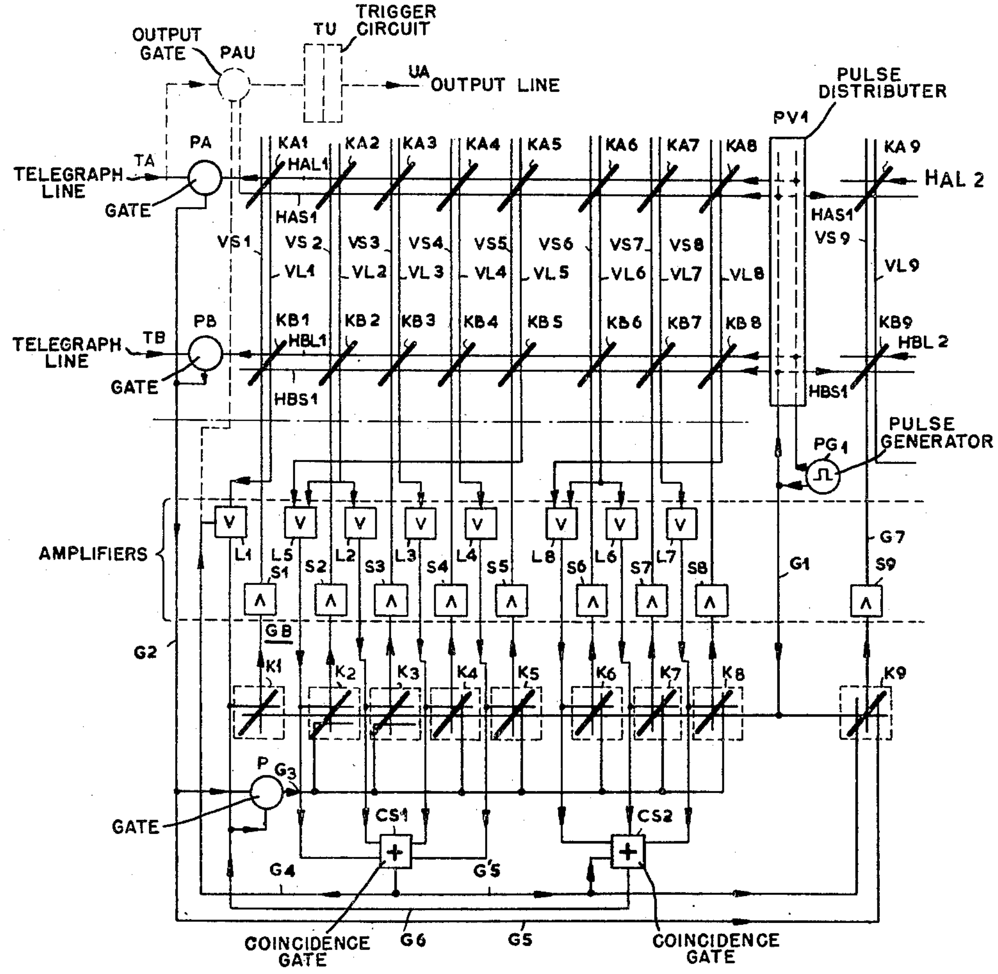

The present invention relates to a regenerative telegraph repeater.

As is known, telegraph signals are liable to distortion by various causes during transmission, so that the transitions between successive elements of opposite polarity are advanced or delayed and the duration of the elements departs from the desired value. Moreover, spurious signals may occur which should as such be distinguishable from the start elements of telegraph signals. Regenerative telegraph repeaters are employed to remove said distortion and to supply the undistorted signals to an outgoing channel or to a reception distributor.

In known systems of this type, each incoming telegraph line comprises an individual time measuring device, for example a number of multivibrators, which is released when receiving a start element and indicates the instants corresponding to the desired middles of the elements if the signals were not distorted, at which instants the polarity of the incoming signals is tested.

A further known regenerative telegraph repeater comprises a pulse-counter which is continuously supplied by a pulse producer and has a cycle time corresponding to the duration of an undistorted element of a telegraph signal, which counter is normally inoperative and is released when receiving a start element, and which at instants corresponding to the desired middles of the elements delivers a pulse under the control of which the electrical condition of the telegraph line is tested.

The conventional systems are comparatively complicated and expensive. The present invention provides a regenerative telegraph repeater which is common to a comparatively large number of telegraph channels and requires only a small number of parts per channel.

According to one aspect of the invention a repeater is provided with the feature that a series of memory cores of magnetic material having a rectangular hysteresis loop is associated with each of a number of incoming telegraph lines, which series are coupled to various outlets of a pulse distributor supplying in cyclic sequence a reading pulse and a recording pulse to the memory cores of the several lines, which cores are further coupled to a corresponding series of common memory cores in such manner that, when supplying a reading pulse to the cores of a given telegraph line, the signal from these cores is transmitted to the common cores and, under the control of the next following recording pulse, is recorded in a different code-combination back into the cores of said given line so that, under the control of successive pulses on the cores of a given telegraph line, a series of different code-combinations is passed. On reading a predetermined code-combination out of the cores of a given line, the system delivers, through a coincidence circuit arrangement, an output for testing the electric condition of the line. Further, when supplying a reading pulse to the memory cores of a given telegraph line, a pulse is moreover supplied to a gate circuit which is associated with the line and which, in the rest state of the line, is conductive whilst, under the control of the output pulse of the gate circuit, the common memory cores are set to a given magnetic condition independently of the information read out of the memory cores of the line.

According to a further aspect of the invention a multiple magnetic shift register is provided particularly suitable for use as a telegraph reception distributor in co-operation with the regenerative telegraph repeater according to the invention.

In the multiple magnetic shift register according to the invention, a common series and an individual series of storage cores of magnetic material having a rectangular hysteresis loop are associated with a number of sources of information, corresponding cores of the individual series being coupled through a common first conductor and a coupling device, which is conductive only in one direction, to a core of the common series, while they are coupled through a common second conductor and a coupling device, which is conductive in the opposite direction, to the next following core of the common series. Further, the individual series of memory cores are coupled to several outlets of a pulse distributor, which supplies in cyclic sequence a first pulse and a second pulse of opposite polarity to the cores of the several individual series, while on each second pulse for the several individual series there is moreover supplied a read-out pulse to the cores of the common series in such manner that a first pulse on a given individual series passes over the information from these cores to the cores of the common series, while under the control of the next following second pulse together with the pulse on the common series said information, shifted by one position, is recorded back into the definite individual series.

Figures 3, 4:
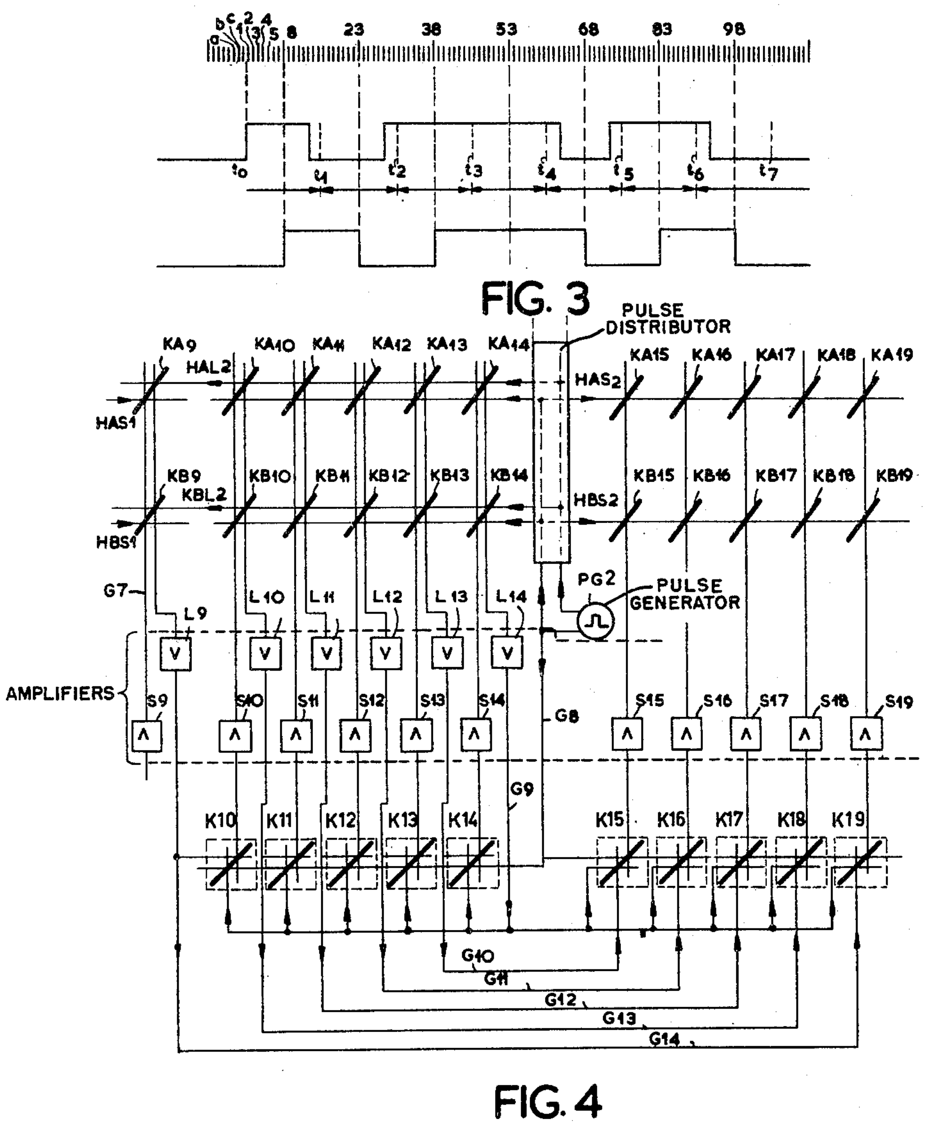

In order that the invention may be readily carried into effect, it will now be described in greater detail with reference to the accompanying drawings, in which FIG. 1 shows a regenerative telegraph repeater according to the invention, FIGS. 2 and 3 are diagrams by means of which the operation of the system shown in FIG. 1 will be explained and FIG. 4 shows a telegraph reception distributor adapted to be connected to the outlets of the repeater shown in FIG. 1.

The repeater shown in FIG. 1 is adapted to co-act simultaneously with a comparatively large number of incoming telegraph lines, for example 60. For simplicity, only the outputs TA and TB of two such lines are shown in the drawings.

The telegraph signals are each made up of seven elements, the first of which (start element) and the last of which (stop element) have fixed mutually opposite polarities, whereas the intermediate elements, which constitute the telegraph signal proper, may have an arbitrary polarity. The polarity of the stop element corresponds to the rest condition of the associated telegraph lines. The duration of the elements may, for example, be nominally 20 milliseconds at a signalling rate of 50 elements a second, while in several systems the stop element may have a duration of 30 milliseconds. For several reasons the incoming signals are liable to distortion so that the duration of the elements may differ from the nominal value. The telegraph signals coming in over the several lines are not in step relatively to one another and also the spacing of the telegraph signals over the same line is random, hence the start elements begin at random instants. Moreover, the start elements should be distinguishable from so-called "false" start signals, whose polarity corresponds to that of the start elements and whose duration is less than 10 millisecond.

The repeater comprises a central control device GB with a number of memory cores K1 . . . K9 of magnetic material having a rectangular hysteresis loop and a number of associated reading amplifiers L1 . . . L8 and recording amplifiers S1 . . . S9. A number of such memory cores KA1 . . . KA9, KB1 . . . KB9 are each individually associated with the several telegraph lines TA and TB. The memory cores may have two different conditions of magnetic remanence, which may be denoted as the conditions 1 and 0 in known manner. The cores KA1 . . . KA8, KB1 . . . KB8 of one and the same line are connected through horizontal reading conductors HAL1, HBL1 and horizontal recording conductors HAS1, HBS1 to the outputs of a pulse-distributing circuit PV1. The standard-pulse producer PG1 alternately supplies pulses to two inputs of the pulse distributor PV1, while one of these pulses is moreover supplied to the cores K1 . . . K9 through the conductor G1. Under the control of these pulses the pulse distributor PV1 supplies in cyclic sequence pulses to the horizontal conductors HAL1, HAS1, HBL1, HBS1 and so on to reading and recording conductors of the various telegraph lines. The pulses through the reading conductors HAL1, HBL1 are moreover delivered to gate circuits PA, PB and so on which are controlled by telegraph lines TA, TB and so on in such manner that the gate circuits are conducting at the instants at which the telegraph lines have a polarity corresponding to the rest condition. In order for the beginning of the start elements to be determined sufficiently accurately, the frequency of the pulse producer PG1 is sufficiently high to supply a pulse fifteen times per 20 milliseconds to the reading and recording conductors of each line and consequently also to the gate circuits PA and PB.

Consequently, two pulses are alternately supplied to the cores associated with the various telegraph lines. The first pulse, which is supplied through the reading conductors HAL1, HBL1 has such a polarity and intensity that cores in the condition 1 pass over to the condition 0, so that a reaction pulse is supplied to the vertical reading conductors VL1 . . . VL8, which pulse is amplified by the reading amplifiers L1 . . . L8 and supplied to the cores K1 . . . K8. Thus, for example, the core K1 takes over the magnetic condition from the core KA1, the core K3 takes over the condition from the core KA2, the core K4 takes over the magnetic condition of the core KA3, the core K5 takes over the condition of the core KA4, the core K7 takes over the condition of the core KA6 and the core K8 takes over the condition of the core KA7. The reading amplifier L5 is so designed as to deliver a pulse only when a pulse is supplied to only one of the reading conductors VL2 and VL5, in other words if the cores KA2 and KA5 were either in the conditions 0 and 1 or in the conditions 1 and 0. Consequently, no pulse is delivered if both cores are in the condition 1 or in the condition 0. Under the control of the output pulse of the amplifier L5 the core K2 assumes the condition 1. The amplifier L8 is designed accordingly so that the amplifier delivers a pulse and causes the core K6 to assume the condition 1 only when the cores KA6 and KA8 assumed relatively opposite conditions.

The second pulse over conductors HAS1, HBS1 has a polarity opposite to that over the conductors HAL1, HBL1 but the strength of these pulses is only approximately half of that required for changing the condition of a core. The pulses over conductors HAS1, HBS1 appear at the same instants as the pulses over the conductor G1, which are supplied to the cores K1 . . . K9. The pulses over the conductor G1 have such a polarity and strength that the cores of the group K1 . . . K9, which assumed the condition 1 are set to the state 0 whilst delivering, over recording amplifiers S1 . . . S9 and vertical recording conductors VS1 . . . VS9, a reaction pulse to the several cores associated with the telegraph lines. The strength of these pulses again amounts to half the value required to set these cores to the state 1. If at the same instant a pulse appears over a given vertical recording conductor VS1 . . . VS9 and, say, the horizontal recording conductor HAS1, the corresponding core of the group KA1 . . . KA9 is set to the state 1 by the joint action of these pulses. The final result of both pulses is, consequently, that intelligence initially stored by cores KA2, KA3, KA4, KA6, KA7 has now been shifted by one position to the right and now is stored by cores KA3, KA4, KA6, KA7 and KA8, while the cores KA2 and KA6 have been set to a state dependent upon the initial states of the cores KA2, KA5 and KA6, KA8 respectively, the state of the core KA1 being unchanged. Under the control of the pulse pairs over conductors HBL1 and HBS1 a corresponding effect ensues. Consequently, the cores K2, K3, K4, K5 and K6, K7, K8 respectively together with the corresponding cores of the several telegraph lines constitute, as it were, two multiple shift registers.

The operation of this circuit arrangement is further as follows: For simplicity, only the telegraph line TA with the associated circuitry will be considered. Assuming this line to be in the rest state at a given instant. Then the core KA1 is in the state 1 so that under the control of a pulse through the conductor HAL1 on the one hand a pulse is supplied through the reading amplifier L1 to an input of the gate circuit P and on the other hand a pulse is delivered through the gate circuit PA and conductor G2 to a second input of the gate circuit P. The gate circuit P then delivers, through the conductor G3, a pulse to the memory cores K2, K3, K4, K5, K6, K7 and K8 in a manner such that these cores are set to the states 0, 0, 1, 1/1, 1, 1/independently of any pulses supplied through reading amplifiers L2 . . . L8. Under the control of the pulses through the conductors HAS1 and G1 the cores KA1 . . . KA8 are thus set to the state 1/0, 0, 1, 1/1, 1, 1/. This is repeated so long as the line TA is in the rest state. When the line TA passes over to the work condition, the gate PA is barred, so that the next following pulse over the conductor HAL1 is not supplied through the conductor G2 to the gate P, hence this gate does not deliver a pulse. Under the control of the pulse through the conductor HAL1 the core K2 passes over to the state 1, since the cores KA2 and KA5 were in the states 0 and 1 so that the amplifier L5 delivers a pulse. The information of the cores KA2, KA3 and KA4, KA6 and KA7 is passed over to the cores K3, K4, K5, K7 and K8, as described before, while the core K6 remains in the state 0, since the amplifier L8 does not deliver a pulse, because both cores KA6 and KA8 were in the state 1. Consequently, the cores K1 . . . K8 then are in the states 1/1, 0, 0, 1/0, 1, 1/ so that the cores KA1 . . .KA8 are set to the same series of states by the pulse over the conductor HAS1. By the second pulse through the conductor HAL1, after establishing the work condition on the telegraph line TA, the cores K1 . . . K8 are set to the states 1/0, 1, 0, 0/1, 0, 1 which states are subsequently again stored in the cores KA1 . . . KA8 by the pulse HAS1. The series of states thus passed is seen in the diagram shown in FIG. 2. When receiving a false start signal, in other words should the work condition on the telegraph line TA be maintained less than 10 milliseconds, the gate PA would again become conductive and the pulse of the conductor HAL1 would be transferred to the conductor G2 and the gate P so that this gate, under the joint action of this pulse and the pulse through the reading amplifier L1, delivers a pulse to the conductor G3, thereby resetting the cores K2 . . . K8 to the initial state. As may be seen from the diagram shown in FIG. 2, this initial state is chosen to be such that after 8 pulses, corresponding to a duration of 10 milliseconds, the cores K2, K3, K4 and K5 simultaneously assume the condition 1. Consequently, if the work condition on the telegraph line TA is maintained longer than 10 milliseconds, in other words when receiving a genuine start element, the amplifiers L2, L3, L4 and L5 simultaneously deliver a pulse to the coincidence gate circuit CS1 at the eight pulse, which gate circuit CS1 then delivers on the one hand through the conductor G4 and the amplifier L1 a pulse to the core K1 so that it is set to the state 0 and on the other hand, through the conductor G5, a pulse to the core K9. Under the action of this pulse the core K9 consequently passes over to the state 1. After the next following pulse through the conductors HAS1 and G1, the cores KA1 . . KA9 are consequently in the states 0/1, 1, 1, 1/0, 1, 1/1/ respectively. The fact that the output core KA9 is in the state 1 is characteristic for the reception of a work element. The core KA9 remains in this state during the next following pulses through the conductor HAL1, since this core is not coupled to this conductor, until in a manner set out hereinafter a pulse is delivered to the reading conductor HAL2. As may be seen from the diagram shown in FIG. 2 the cores K2, K3, K4 and K5 resume the initial state after 15 pulses corresponding to 20 milliseconds, following which the cycle is repeated. Similarly, the cores K6, K7 and K8 pass through a series of condition variations with a repetition period of 7 pulses. Consequently, these cores together with the corresponding cores of the telegraph lines constitute two different counting circuits. After the 8th pulse the core KA1 remains in the state 0, so that the amplifier L1 is no longer able to deliver a pulse and the gate P remains barred, independently of the voltage on the telegraph line TA. Consequently, the counting circuits keeps counting. On the 23rd pulse over the conductor HAL1 the cores K2, K3, K4 and K5 simultaneously reassume the state 1 and the coincidence gate circuit GS1 again delivers, through the conductor G5, a pulse to the core K9. If on the occurrence of the 23rd pulse line TA is in the rest condition gate PA is conductive and a second pulse is applied to core K9 through gate PA, conductor G2 and G5. This pulse has such a polarity that core K9 stays in the 0 state. If on the other hand line TA is in the work condition gate PA is barred and core K9 assumes state 4 under control of the pulse from the coincident gate circuit CS1. The state of core K9 corresponds therefore to the state of line TA.

FIG. 3 illustrates by way of example the situation when receiving a distorted telegraph sign *"d"* made up of a start element, a rest element, two work elements, a rest element, a work element and a stop element. In the case of an undistorted telegraph sign the various changes of polarity should have occurred with a relative interval of 20 milliseconds at instants $t_0$, $t_1$, $t_2$, $t_4$, $t_5$ and $t_6$. However, the first change of polarity after the onset of the start element is premature, similarly as the second, whereas the third, which should appear at the instant $t_4$, is late, the fourth is again premature and the fifth is late.

The 23rd pulse over the conductor HAL1 appears at the instant corresponding to the middle of the first code-element of the telegraph signal, should this be undistorted, which element then is a rest element. The gate circuit PA is then conductive and a pulse is supplied through conductors G2 and G5 to the core K9, so that it remains in the state 0. Consequently, after the next following pulse over the conductor HAS1, the core KA9 is also in the state 0. Similarly, on the 38th, 53rd, 68th, 83rd and 98th pulses of the pulse distributor PV1, the gate circuit CS1 delivers a pulse to the core K9 and on the 68th and 98th pulses a pulse is delivered through gate PA, conductors G2 and G5 to the core K9, which is then set to the states 1, 1, 0, 1 and 0 respectively, which states are subsequently again stored in the core KA9. Meanwhile, the cores K6, K7 and K8 have also passed a series of condition variations with a repetition period of seven pulses, as shown in FIG. 2. The output pulses of the amplifiers L6, L7 and L8 are moreover supplied to the coincidence circuit CS2. On the 98th pulse, corresponding to the middle of the last element or stop element of the telegraph signal, the amplifiers L6, L7 and L8 simultaneously deliver a pulse to the gate circuit CS2, while the gate circuit CS1 supplies a pulse to this gate circuit through the conductor G5. As a result the gate circuit CS2 delivers over the conductor G6 a pulse to the core K1, so that the latter assumes the condition 1 and to the gate circuit P which, moreover, receives a pulse from the gate PA over the conductor G2, since the telegraph line TA is again in the rest condition. The output pulse of the gate P over the conductor G3 causes the cores K2 . . . K8 to resume the initial state. This situation prevails until reception of the next-following start signal.

In the regenerative telegraph repeater herein described, which is intended to co-act with the reception distributor shown in FIG. 4, the voltage of the lines is tested at instants corresponding to the middles of the elements of the telegraph signals, and the cores KA9, KB9 and so on are set to a corresponding condition, which is afterwards read by the telegraph reception distributor, as will be described hereinafter. If, however, the repeater has to pass on the regenerated telegraph signals directly to outgoing lines, the cores KA9, KB9 and K9 may be omitted. In this case, the circuit is designed as shown in FIG. 1. At the instants corresponding to the middle of the telegraph elements, the coincidence gate circuit CS1 delivers a pulse to the output gate PAU of the telegraph line TA and, moreover, a pulse is supplied to this gate through the conductor HAS1. The gate PAU controls the trigger circuit TU at these instants in such manner that the trigger TU is set to an electric state corresponding to the voltage on the telegraph line TA. An output of the trigger TU is connected to the outgoing line UA on which the regenerated telegraph signals then appear with a delay of 10 milliseconds relatively to the signals coming in over the telegraph line TA.

The multiple telegraph reception distributor shown in FIG. 4 comprises a shift register which is designed in a manner similar to that of the counting circuits of the system shown in FIG. 1. This shift register is made up of memory cores KA10 . . . KA14, KB10 . . . KB14 each individually associated with the various telegraph lines, and cores K10 . . . K14 in the common part of the shift register. The cores KA15 . . . KA19, KB15 . . . KB19, which co-act with cores K15 . . . K19 constitute the output of the reception distributor. The cores KA9 and KB9 are the same as those in FIG. 1. The system further comprises a pulse distributor PV2 which, under the control of pulse-producer PG2, delivers pulses in cyclic succession to the horizontal control conductors HAL2, HAS2, HBL2, HBS2. These pulses have the same polarity and strength as the corresponding pulses in the system shown in FIG. 1. In this case, however, the repetition time is 20 milliseconds, corresponding to the duration of an element of a telegraph signal. The pulse producer PG2 is in step with the pulse producer PG1 shown in FIG. 1. The telegraph signal elements stored in the cores KA9, KB9 and so on by the telegraph repeater shown in FIG. 1 are read out every 20 milliseconds under the control of the reading pulses over the conductors HAL2, HBL2, and so on, and transferred to the core K10 through the reading amplifier L9. At these instants, moreover, the information of the cores KA10 . . . KA13, KB10 . . . KB13 is read out and stored in the cores K11 . . . K14 through reading amplifiers L10 . . . L13. By the next following recording pulse over conductors HAS2, HBS2, which pulses appear at the same instants as the pulses delivered by the generator PG2 over the conductor G8 to the cores K10 . . . K19, the information K10 . . . K14 is passed on to the relevant cores KA10 . . . KA14, KB10 . . . KB14 and so on, the information of the cores of one and the same line thus again being shifted by one position to the right. Assuming the cores KA9 . . . KA14 to be in state 0 at a given instant. When the core KA9 assumes the condition 1, which means reception of a start element, the next following read-out pulse on the conductor HAL2 sets the core K10 to the state 1, which information is subsequently transferred to the core KA10. After five pulses the core KA14 is consequently in the state 1, and the four next following elements of the telegraph signal have been stored in the cores KA13, KA12, KA11 and KA10 respectively. On the 6th pulse, the last element of the telegraph signal proper is transferred from the core KA9 to the core K10, while the four preceding elements are stored in cores K11, K12, K13 and K14. The five elements of the telegraph signal proper are then consequently recorded by cores K14, K13, K12, K11 and K10 respectively. At the same instant, the start element, which was in the core KA14, is read out so that the reading amplifier L14 delivers a pulse. By means not further referred to, this pulse is slightly delayed and delivered to cores K10 . . . K14, thereby setting the cores K10 . . . K14 to the state 0, the cores in the state 1 then delivering a reaction pulse to conductors G10, G11, G12, G13 and G14. Under the control of these pulses, in co-operation with the pulse delivered over the conductor G9 to cores K15 . . . K19, the relevant cores of this group are set to the state 1. After the read-out pulse over conductors HAS2 and G8, the various elements of the telegraph signal are consequently recorded by the cores KA15 . . . KA19. The telegraph signals, the various elements of which are successively received over the telegraph line TA are consequently, at given instants, recorded in their entirety by the cores KA15 . . . KA19 and the several elements can consequently be read out simultaneously by means not further referred to, for example for controlling a reperforator receiver or passed on to an other type of register.

What is claimed is:

1. A system for regenerating telegraph signals comprising a source of said signals, a first series of memory elements, a second series of memory elements, means cyclically transferring information from said first series of elements to said second series of elements and re-recording said information in said first series of elements in a different combination whereby said elements cyclically pass through a series of information variations with a repetition period equal to the duration of an undistorted telegraph signal element, coincidence circuit means connected to said series of elements to provide cyclically occurring output pulses, gate circuit means, means applying said signals to said gate circuit means to provide control pulses when said signals are in a rest state, means applying said control pulses to said second series of elements to record predetermined information therein independently of information in said first series of elements, means applying said output pulses to said means applying said control pulses for blocking application of said control pulses to said second series of elements upon the reception of a start element, and test circuit means connected to said coincidence circuit means for providing an output signal responsive to the state of said telegraph signal at the instants of said output pulses.

2. A system for regenerating telegraph signals comprising a source of said signals, normally inoperative pulse counter means for producing a train of pulses having a cycle time equal to the duration of an undistorted telegraph signal element, means for releasing said pulse counter means upon reception of a start element whereby said pulses occur at instants corresponding to the middles of the element of said signals, test means operatively controlled by said pulses to indicate the electric state of said signals, said pulse counter means comprising first and second series of magnetic cores of magnetic material having rectangular hysteresis loops, a source of pulses, pulse distributor means connected to said source of pulses for applying recording and reading pulses to said first series of cores in cyclic sequence, means coupling said first series of cores to said second series of cores whereby information is transferred to said second series during said reading pulses and re-recorded on said first series in a different combination during said recording pulses so that said cores pass through a cyclic series of condition variations, and coincidence circuit means connected to said series of cores to provide said train of pulses, gate circuit means, means applying said signals to said gate circuit means to provide control pulses only when said signals are in a rest state, means applying said control pulses to said second series to cyclically record thereon a predetermined signal independently of the information of said first series, and means applying said train of pulses to said control pulse applying means for blocking application of said predetermined signal to said series of elements.

3. The system of claim 2, in which said means coupling said series of cores comprises means transferring information from all but one of said first series of cores to a corresponding core of said second series, means transferring the information of each core of said second series to the cores of said first series in a shifted relationship, and means transferring the information of said one core and another core of said first series to one of the cores of said second series whereby the information transferred depends upon the relative information of said one and other core of said first series.

4. The system of claim 2, comprising means for continually transferring information between one core of said first series and one core of said second series to provide a gating pulse, second gate means, means applying said gating pulse and said control pulse to said second gate means to apply said predetermined signal to said series of cores, and means applying said train of pulses to said one core of said second series to block application of said predetermined signal to said series of cores.

5. The system of claim 2, comprising a third and fourth series of cores, means coupling said last-mentioned cores to provide a cyclic series of condition variations of different frequency than the variations of said first and second series, second coincidence circuit means, means connecting said second coincidence circuit means to said third and fourth series of cores and to the output of said first coincidence circuit means, and means applying the output of said second coincidence circuit means to said control pulse applying means to restore the application of said predetermined information to said series of cores.

6. A system for regenerating telegraph signals comprising a plurality of sources of said signals, normally inoperative pulse counter means for producing trains of pulses having a timing cycle equal to the duration of an undistorted telegraph signal element, means for releasing said pulse counter means upon reception of a start element whereby said pulses occur at instants corresponding to the middles of the elements of said signals, test means operatively controlled by said pulses to indicate the electric state of said signals, said pulse counter means comprising a first series of cores of magnetic material having rectangular hysteresis loops for each of said sources, a common series of cores of magnetic material having rectangular hysteresis loops, a source of pulses, pulse distributor means connected to said source of pulses for applying recording and reading pulses to the cores of said first series in cyclic sequence, means coupling each of said first series of cores to said common series of cores whereby information is cyclically transferred from each of said first series to said common series and back to the respective first series in a different combination, whereby said cores pass through cyclic series of condition variations, and coincidence circuit means connected to said common cores to provide said trains of pulses, gate circuit means for each of said sources of signals, means applying said signals to the respective gate means to provide control pulses only when the respective signals are in rest state, means applying said control pulses to said common cores to record thereon a predetermined information independently of information transferred thereto by the respective first series of cores, and means applying said trains of pulses to said control pulse applying means for blocking application of said predetermined information to said common series of cores.

7. The system of claim 6, comprising a multiple magnetic shift register, said register comprising a second series of magnetic cores for each signal and a second common series of cores, unidirectional means coupling a core of each of said second series through a first common conductor to a corresponding core of said second common series, unidirectional means coupling each core of the second common series through a second common conductor to the next following cores of each of said second series of cores, means coupling the first core of each of said second series of cores to the respective said test means, second pulse distributor means, means coupling each of said second series of cores to said second pulse distributor means to transfer information to said second common series, and means coupling said second common series of cores to said pulse distributor means to transfer information back to the respective second series of cores in shifted relationship.

References Cited in the file of this patent

UNITED STATES PATENTS

| | | |
|---|---|---|
| 2,828,358 | Ridler | Mar. 25, 1958 |
| 2,833,858 | Grondin | May 6, 1958 |